United States Patent
Usui

(10) Patent No.: US 6,500,565 B2
(45) Date of Patent: Dec. 31, 2002

(54) CORROSION RESISTANT RESIN COATING STRUCTURE IN A METAL TUBE

(75) Inventor: Masayoshi Usui, Numazu (JP)

(73) Assignee: Usui Kokusai Sangyo Kaisha Limited, Shizuoka Prefecture (JP)

( * ) Notice: Subject to any disclaimer, the term of this patent is extended or adjusted under 35 U.S.C. 154(b) by 0 days.

(21) Appl. No.: 09/134,985

(22) Filed: Aug. 17, 1998

(65) Prior Publication Data

US 2002/0090528 A1 Jul. 11, 2002

Related U.S. Application Data

(63) Continuation-in-part of application No. 08/960,571, filed on Oct. 29, 1997, now abandoned, which is a continuation of application No. 08/814,011, filed on Mar. 10, 1997, now abandoned, which is a continuation of application No. 08/519,901, filed on May 28, 1995, now abandoned.

(51) Int. Cl.⁷ .............................. B32B 1/08; B32B 15/08; F16L 9/147
(52) U.S. Cl. ..................... 428/623; 428/626; 428/632; 428/658; 428/659; 138/146
(58) Field of Search .................... 428/658, 659, 428/626, 623, 622, 629, 632; 138/146, DIG. 7, DIG. 3

(56) References Cited

U.S. PATENT DOCUMENTS

| | | | | |
|---|---|---|---|---|
| 3,808,057 A | * | 4/1974 | Labenski et al. ............ | 148/6.2 |
| 3,961,992 A | * | 6/1976 | Jahnke et al. ............... | 428/623 |
| 3,999,957 A | * | 12/1976 | Tongyai ..................... | 428/626 |
| 4,003,760 A | * | 1/1977 | Labenski et al. ............ | 148/6.2 |
| 4,444,601 A | * | 4/1984 | Greene ...................... | 428/658 |
| 4,804,587 A | * | 2/1989 | Takeuchi et al. ............ | 428/623 |
| 4,853,297 A | * | 8/1989 | Takahashi et al. ........... | 28/623 |
| 5,141,822 A | * | 8/1992 | Matsuo et al. .............. | 428/623 |
| 5,147,730 A | * | 9/1992 | Ogishi et al. ............... | 428/623 |

FOREIGN PATENT DOCUMENTS

| | | | |
|---|---|---|---|
| JP | 58-167781 | * | 10/1983 |
| JP | 2-80242 | * | 3/1990 |
| JP | 8-75084 | * | 3/1996 |
| JP | 9-11398 | * | 1/1997 |

* cited by examiner

Primary Examiner—John J. Zimmerman
(74) Attorney, Agent, or Firm—Rader, Fishman & Grauer

(57) ABSTRACT

The present invention provides a corrosion resistant resin coating excellent in corrosion resistance, weather resistance and chemical resistance, mechanically tough and strong and having high heat resistance temperature. A steel tube optionally having a copper layer is formed. Then, a zinc or zinc/nickel plating layer is formed on the outer circumferential surface of the steel tube, and a chromate film comprising a trivalent chromium compound is formed on the zinc or zinc/nickel plating layer. At least one layer of a kind of resin selected from the group consisting of polyvinyl fluoride, polyvinylidene fluoride, polypropylene, polyethylene and polyamide resins is formed, as required, through a primer. Sufficiently satisfactory results are obtained in corrosion resistance test.

9 Claims, 2 Drawing Sheets

PRIOR ART

CORROSION RESISTANT RESIN COATING STRUCTURE IN A METAL TUBE

This application is a continuation-in-part of application Ser. No. 08/960,571, now abandoned filed Oct. 29, 1997 which is a continuation of application Ser. No. 08/814,011 filed Mar. 10, 1997, now abandoned; which is a continuation of application Ser. No. 08/519,901 filed May 28, 1995, now abandoned.

BACKGROUND OF THE INVENTION

1. Field of the Invention

The present invention concerns a corrosion resistant resin coating structure in a metal tube, among all, a metal tube of a tube diameter, particularly, of less than 30 nm, having excellent adhesion and excellent chemical and mechanical corrosion resistance, which is disposed in plurality as pipelines for brake oil or fuel of automobiles or feed channels for feeding oil or air to various kinds of machines and equipments.

2. Description of the Prior Art

A protection coating has been applied to an outer surface of a metal tube. For instance, pipelines for brake oil or fuel of automobiles undergo severe working conditions since they are disposed to an under floor surface of the automobiles, and they are required to have chemical resistance, as well as scratch resistance, impact resistance or resistance to injuries caused by external mechanical forces. Further, corrosion of pipelines caused by rock salt as a road anti-freezing agent has presented a further problem. Accordingly, it has been desired for a metal tube structure applied with a protection coating capable of withstanding mechanical erosion and also chemical corrosion, for which various proposals have been made.

That is, there have been known protection coatings, for example, formed by applying a zinc plating layer by electric plating on an outer surface of a metal tube, forming a relatively thick olive-colored specific chromate film on the plating layer and forming a fluoro resin layer further thereon (for example, U.S. Pat. Nos. 3,808,057 and 4,003,760), forming a polyvinyl fluoride layer comprising two fluoro resin layers fused to each other (Japanese Utility Model Publication Hei 3-11517) and, further, forming an epoxy resin intermediate layer between a chromate film and a polyvinyl fluoride layer (Japanese Patent Application Sho 62-84429).

In such existent corrosion resistant resin coating structure in such metal tubes, an epoxy resin intermediate layer or a fluoro resin such as a polyvinyl fluoride resin is coated by way of a relatively thick chromate film formed from a chromate solution comprising hexavalent chromium ions on a zinc plating layer applied at least to an outer circumferential surface of a tube material. However, since the resin layers are baked at a high temperature, it results in a problem that the chromate film suffers from remarkable thermal degradation and the corrosion resistance inherent to the chromate film is inevitably reduced by the heat treatment. Further, formation of the chromate film with a chromate solution generally involves a problem that hexavalent chromium ions contained in a treating solution and an acid added as a reducing agent are consumed in a great amount, so that each of ingredients of the treating solution has to be supplemented and renewed at a predetermined interval for maintaining a certain layer-forming performance, which increases a cost for disposing wastes containing a great amount of deleterious hexavalent chromium which is a cancerogenic substance so as to solve the ecological problems. Further, although the chromate film as formed by the chromate solution is of a large layer thickness and has excellent corrosion resistance, water content is expelled by heat applied when the resin layer is formed to make the coating film brittle, which leads to fine cracks by plastic deformation caused by subsequent bending fabrication or flare fabrication at tube ends, to bring about a problem of reducing the inherent anti-rust performance.

SUMMARY OF THE INVENTION

It is, accordingly, an object of the present invention to provide a corrosion resistant resin coating structure of excellent corrosion resistance, weather resistance and chemical resistance, having mechanical strength and tough and having a high heat resistant temperature.

The present inventor has made various studies for solving the foregoing problems and attaining the above-mentioned object and, as a result, has accomplished the present invention based on the finding that the above-mentioned object can be attained by forming a chromate film by using a chromate solution containing only trivalent chromium ions.

That is, the present invention provides a corrosion resistant resin coating structure of a metal tube comprising a metal tube, a zinc or zinc/nickel plating layer formed on an outer circumferential surface of the metal tube, a chromate film comprising a trivalent chromium compound formed on the plating layer and a kind of resin layer selected from the group consisting of polyvinyl fluoride, polyvinylidene fluoride, polypropylene, polyethylene and polyamide resins formed on the chromate film. The present invention further provides a corrosion resistant resin coating structure comprising a metal tube, a zinc or zinc/nickel plating layer formed on an outer circumferential surface of the thin-walled fine diameter metal tube, a chromate film comprising a trivalent chromium compound formed on the plating layer, a primer selected from the group consisting of epoxy resin formed on the chromate film, polyamide resin, silane coupling agent and a kind of resin layer selected from the group consisting of polyvinyl fluoride formed through the primer, polyvinylidene fluoride, polypropylene, polyethylene and polyamide resins.

DETAILED DESCRIPTION OF THE INVENTION

Figure 1:
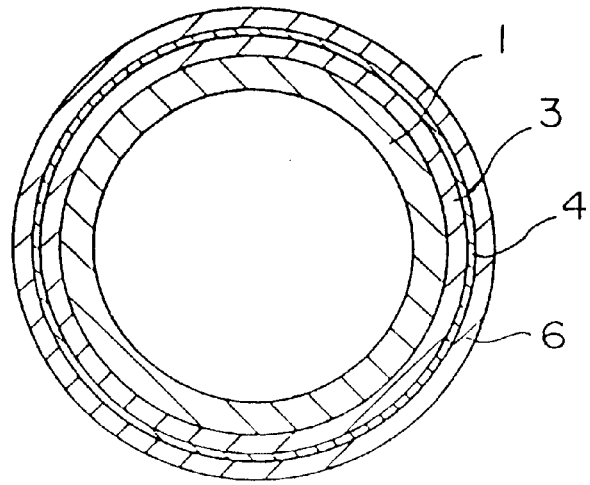
FIG. 1 is a cross sectional view of a preferred embodiment of a corrosion resistant resin coating structure corresponding to Example 1 according to the present invention, exaggerated in a diametrical cross section of a metal tube.

As a metal tube in the present invention, a single-wound steel tube or a double-wound steel tube prepared from a SPCC steel sheet is used for instance and the tube may have a copper plating layer of about 3 um thickness to an outer circumferential surface. Further, as a steel tube, electrounite steel tube or drawn steel tube may also be used and, further, other metal tubes of appropriate material such as an aluminum tube or a steel tube may also be used. In addition, there is no particular restriction on the wall thickness of the metal tube and both thin-walled and thick-walled tube may be used.

The zinc plating layer is formed by using a generally known alkali electrolyzing solution containing an electrolyzing solution rendered acidic with sulfuric acid or zinc cyanate, and the zinc/nickel plating layer is formed by an electrolyzing solution rendered acidic with hydrochloric acid.

Formation of the chromate film is determined by taking into consideration of such the factor as treatment time and/or temperature. For formation of a blue white chromate film there employs generally a chromate treating solution at a low concentration of trivalent chromium ion concentration of 30 mg/l–1.5 g/l, preferably, 0.8 g/l–1.2 g/l. If the trivalent chromium ion concentration is less than 30 mg/l, a desired chromate film cannot efficiently be obtained. If the trivalent chromium ion concentration is more than 1.5 g/l, a zinc or zinc-nickel plating layer which is an undercoat will be dissolved.

In the present invention, since the chromate film is formed by using a chromate solution only containing trivalent chromium ions, it can remarkably reduce heat degradation at a high temperature upon heat drying after coating the primer hereinafter described and the resin of the outermost layer and, at the same time, it provides excellent close adhesion with the epoxy resin intermediate layer. It is considered that since the chromate film formed from the chromate solution containing trivalent chromium ions comprises a trivalent chromium complex compound and forms a relatively thin passivated layer, it suffers from less heat degradation. Further, although it has been found that the trivalent chromate film has excellent close adhesion with the primer, details for the mechanism are not apparent.

The primer is formed on the chromate film by coating a single layer of epoxy resin and polyamide resin or silane coupling agent and titanium coupling agent, the coating of which being conducted by extrusion molding, spraying, showering, immersing, brush-coating, powder-coating or hot-melting. In case of using, for example, epoxy polyester, the primer can be formed at 250° C. for 60 sec.

On the above-mentioned chromate film or primer a layer of polyvinyl fluoride or polyvinylidene fluoride having a thickness of 10–50 $\mu$m is formed by immersion or a layer of polyamide resins (PA) such as PA6, PA66, PA11 or PA12, polypropylene (PP) or polyethylene (PE) having 20–30 $\mu$m is formed by extrusion-molding. If the outermost layer composed of any of the above-mentioned resin layers has the trivalent chromium ion concentration of less than the foregoing mentioned lower limit, it will be provided with less corrosion resistance. On the other hand, if the outermost layer has the trivalent chromium ion concentration of exceeding the foregoing mentioned upper limit, it will become an expensive product, as its corrosion resistance is not improved. In case of using, for example, polyvinyl fluoride or polyvinylidene fluoride for the outermost layer, it will be produced by immersing in a solvent such as diethyl phthalate and heating at a temperature of 350° C. for 60 sec.

Examples of the present invention will be explained with reference to the appended drawings.

EXAMPLE 1

(1) Metal tube: Single-wound steel tube 1 having 4.76 mm outer diameter and 0.7 mm wall thickness was fabricated from a CC steel sheet.

(2) Zinc plating layer: A zinc plating layer 3 of 25 um thickness was formed on an outer circumferential surface of the single-wound steel tube 1 fabricated using zinc sulfate as a main ingredient, adding an organic additive and supplying an electric current at a current density of 60 A/dm$^2$ at a temperature from 55 to 60° C.

(3) Chromate film comprising a trivalent chromium compound: A blue white chromate film 4 was formed on the zinc plating layer 3 obtained in (2), by a low concentration chromate treating solution at trivalent chromium ion conc (1 g)/l.

(4) The outermost resin layer: A resin layer 6 composed of polyvinyl fluoride of 20 um thickness was formed by dipping the single-wound steel tube 1 subjected to the treatment (2), (3) above into a solution containing polyvinyl fluoride dispersed in diethyl phthalate, thereby to applying coating, and applying heat treatment at 300° C. for 60 sec.

(5) Corrosion resistance test: For five as shown in Fig. 1 manufactured as described above, test pieces were cut each into 300 mm to prepare ten test specimens in total. Then, injuries leaching the substrate steel were made each at 20 mm interval and a salt spray test according to JIS Z 2371 was conducted for 1,000 hours for the portions while leaving one-half of the test specimens as they were and heating another half of the test specimens at 150° C. for 24 hours. Subsequently, a cellophane tape was closely bonded to and peeled from the knife injured portions to measure the maximum peeling width of the outermost resin layer composed of polyvinyl fluoride from the knife injured portion. The results are shown in Table 1.

EXAMPLE 2

(1) Metal tube: Double-wound steel tube 1 having 8 mm outer diameter and 0.7 mm wall thickness was fabricated from a SPCC steel sheet having a copper layer 2 of 5 um film thickness.

(2) A zinc plating layer 3, (3) chromate film 4 comprising a trivalent chromium compound were formed by the same manner as in Examples 1-(2) and (3). (4) The outermost resin layer: A polyvinyl fluoride layer 6 of 20 um thickness was formed by dipping the single-wound steel tube 1 subjected to the treatment (2), (3) above into a solution containing polyvinyl fluoride dispersed in diethyl phthalate to apply coating, and applying heat treatment at 300° C. for 60 sec.

(3) Corrosion resistance test of five products as shown in Table 2 was conducted in the same manner as in Example 1-(5). The results are shown in Table 1.

EXAMPLE 3

(1) Metal tube: A single-wound steel tube which is the same as described in Example 1-(1) was used.

(2) A zinc plating layer 3 was formed in the same manner as described in Example 1-(2), (3) Chromate film 4 composed of trivalent chromium compound was formed in the same manner as described in Example 1-(3) defining the trivalent chromium ion concentration to be 40 mg/l.

(4) The outermost resin layer: A resin layer 6 composed of polyamide resin and having a thickness of 50 μm was formed by extrusion-molding PA12 in polyamide resins on the outer peripheral surface of a double-wound steel tube 1 formed through the above (2) and (3).

Figure 2:
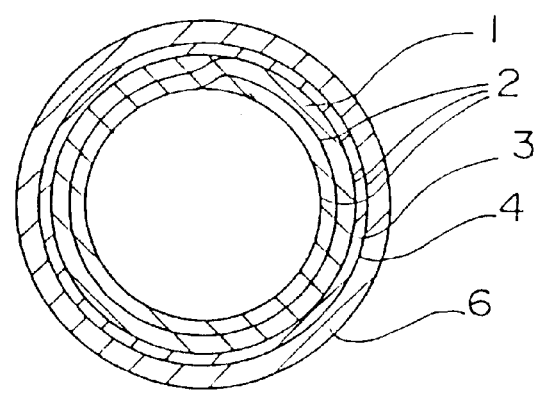
FIG. 2 is a cross sectional view of a preferred embodiment of a corrosion resistant resin coating structure corresponding to Example 2 according to the present invention exaggerated in a diametrical cross section of a metal tube.

(5) Corrosion resistance test: The corrosion resistance test of five products as produced in the above-mentioned manner as shown in Fig.2 was conducted in the same manner as in Example 1-(5). The results are shown in Table 1.

COMPARATIVE EXAMPLE 1

Corrosion resistant resin coating tubes were manufactured in the same manner as in Example 1 except for using a chromate solution containing hexavalent chromium ions for chromate films, and a corrosion resistance test was conducted in the same manner as in Example 1-(5), and the results are shown in Table 1.

(4) Primer: A primer 5 composed of epoxy resin was formed in the same manner as in Example 3-(4).

(5) The outermost resin layer: A resin layer 6 composed of polyvinilidene fluoride is formed in the same manner as in Example 2-(5).

Figure 4:
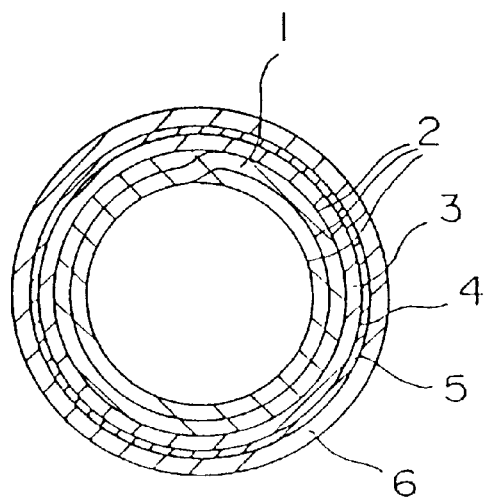
FIG. 4 is a cross sectional view of a preferred embodiment of a corrosion resistant resin coating structure corresponding to Example 4 according to the present invention exaggerated in a diametrical cross section of a metal tube.

(6) Corrosion resistance test: The corrosion resistance test of five products as produced in the above-mentioned manner and shown in Fig.4 was conducted in the same manner as in Example 1-(5). The results are shown in Table 2.

EXAMPLE 6

(1) Metal tube: Double-wound steel tube as in Example 2-(1) was used.

(2) Zinc-nickel plating layer 3: A zinc-nickel platting layer 3 having a thickness of 8 μm and composed mainly of zinc chloride with addition of organic additive was formed on the outer peripheral surface of the double-wound steel tube 1 as produced in the above (1) by passing an electric current having a current density of 50 A/dm$^2$ for 35 seconds at a temperature of 55–60° C.

(3) A chromate film 4 composed of trivalent chromium compound was formed in the same manner as in Example

TABLE 1

(Unit: mm)

|  | Example 1 | | Example 2 | | Example 3 | | Comp. Example 1 | |
| --- | --- | --- | --- | --- | --- | --- | --- | --- |
|  | Not-heated | Heated | Not-heated | Heated | Not-heated | Heated | Not-heated | Heated |
| 1 | 7 | 6 | 6 | 7 | 6 | 6 | 9 | 12 |
| 2 | 6 | 10 | 8 | 9 | 5 | 7 | 11 | 14 |
| 3 | 9 | 8 | 5 | 7 | 8 | 8 | 10 | 13 |
| 4 | 8 | 8 | 6 | 8 | 7 | 10 | 13 | 16 |
| 5 | 6 | 7 | 6 | 6 | 8 | 9 | 10 | 15 |
| Average | 7.2 | 7.8 | 6.2 | 7.4 | 6.6 | 8 | 10.6 | 14.0 |

EXAMPLE 4

(1) Metal tube: Electrounite tube 1 having the same material as in Example 1-(1) and having 6.35 mm outer diameter and 1.5 mm wall thickness was used.

(2) Zinc plating layer 3, (3) chromate film 4 comprising trivalent chromium compound was formed in the same manner as in Examples 1-(2), (3). Primer: Primer 5 composed of epoxy resins was dipped, for example, by using epoxy-polyester and coated, heat treatment was applied at 250° C. for 90 sec to form an epoxy resin intermediate layer of 5 um thickness was formed by dipping, coating and heat treating at 250° C. to 90 sec to form the primer composed of expoxy resins and having 5 μm thick by heat treatment at 90° C. for 250° C.

(3) The outermost resin layer: A resin layer 6 composed of polyvinyl fluoride is shown in same manner as in Example 1-(4).

Figure 3:
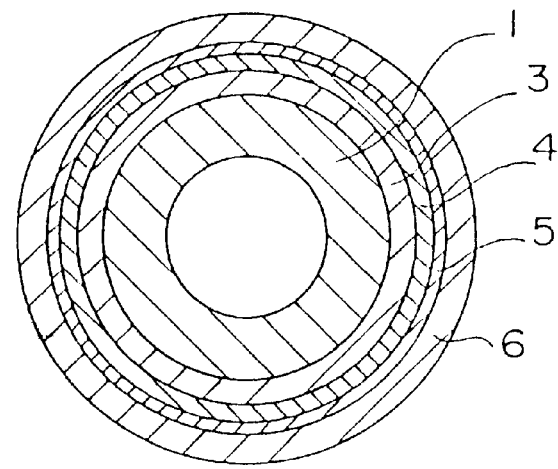
FIG. 3 is a cross sectional view of a preferred embodiment of a corrosion resistant resin coating structure corresponding to Example 3 according to the present invention exaggerated in a diametrical cross section of a metal tube;.

(4) Corrosion resistance test: The corrosion resistance test of five products as produced in the above mentioned manner and shown in Fig. 3 was conducted in the same manner as in Example 1-(5). The results are shown in Table 2.

EXAMPLE 5

(1) Metal tube: Double-wound steel tube 1 as in Example 1-(1) was used.

(2) Zinc plating layer 3, (3) chromate film 4 comprising trivalent chromium compound was formed in the same manner as in Examples 1-(2), (3).

1-(3) except defining the trivalent chromium ion concentration to be 1.2 g/l.

(4) Primer: A silane coupling agent used as a primer was coated on the outer peripheral surface of the double-wound steel tube 1 as processed in the above (2) and (3) and heated and dried.

(5) The outermost resin layer: A resin layer 6 composed of polyethylene and having a thickness of 30 μm was extrusion-molded in the same manner as in Example 3-(4).

(6) Corrosion resistance test: The corrosion resistance test of 5 products as produced in the above-mentioned manner and shown in Fig. 4 was conducted in the same manner as in Example 1-(5). The results are shown in Table 2.

COMPARATIVE EXAMPLE 2

Figure 5:
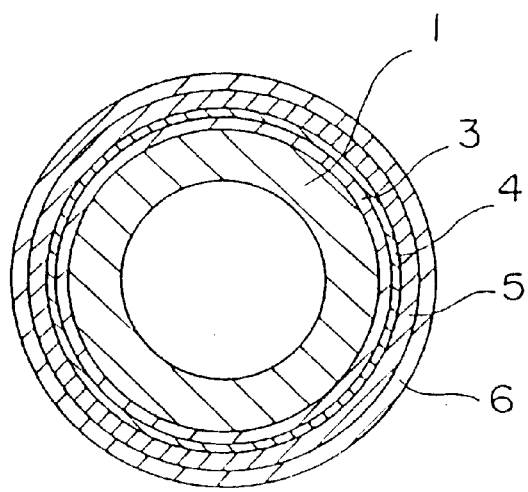
FIG. 5 is a cross sectional view of a metal tube of the prior art, exaggerated in a diametrical cross section.

Corrosion resistant resin coating tubes as shown in Fig. 5 were manufactured in the same manner as in Example 3 except for using a chromate solution containing hexavalent chromium ions for chromate films, and a corrosion resistance test was conducted in the same manner as in Example 1-(5), and the results are shown in Table 2.

TABLE 2

| | Example 4 | | Example 5 | | Example 6 | | (Unit: mm) Comp. Example 2 | |
|---|---|---|---|---|---|---|---|---|
| | Not-heated | Heated | Not-heated | Heated | Not-heated | Heated | Not-heated | Heated |
| 1 | 1 | 1 | 3 | 5 | 1 | 3 | 3 | 5 |
| 2 | 2 | 3 | 4 | 5 | 3 | 5 | 4 | 6 |
| 3 | 2 | 2 | 2 | 3 | 2 | 2 | 3 | 5 |
| 4 | 1 | 2 | 2 | 3 | 1 | 3 | 5 | 6 |
| 5 | 2 | 3 | 2 | 2 | 3 | 4 | 3 | 5 |
| Average | 1.6 | 2.2 | 2.6 | 3.6 | 2 | 3.4 | 3.6 | 5.4 |

As has been described above according to the present invention, since the chromate film was formed and constituted as described above by using a solution containing only trivalent chromium ions as the chromate solution, the film does not cause cracking or peeling also upon plastic deformation such as bending fabrication, as well as it is mechanically tough and strong, has high heat resistance temperature and is excellent in corrosion resistance, weather resistance and chemical resistance, to provide a remarkable effect.

What is claimed is:

1. A corrosion resistant resin coating structure on a metal tube, comprising a metal tube, a zinc or zinc/nickel plating layer formed on the outer circumferential surface of said metal tube, a chromate film consisting essentially of a trivalent chromium compound and formed on said plating layer, and a resin layer composed of a resin selected from the group consisting of polyvinyl fluoride and polyvinylidene fluoride resins formed on said chromate film.

2. The resin coating structure of claim 1, wherein a primer composed of a material selected from the group consisting of epoxy resin, polyamide resin, silane coupling agent and titanium coupling agent is interposed between the chromate film and the resin layer.

3. The resin coating structure of claim 1 or 2, wherein a copper layer is further provided on the surface of the metal tube.

4. The resin coating structure of claim 1 or 2, wherein the metal tube is a steel tube or an aluminum tube.

5. The resin coating structure of claim 1 or 2, wherein the metal tube comprises a single-wound tube, a double-wound tube, an electro-resistance-welded steel tube or a solid-drawn steel tube.

6. A corrosion resistant resin coating structure on a metal tube comprising a metal tube, a zinc or zinc/nickel plating layer formed on the outer circumferential surface of said metal tube, a chromate film consisting essentially of a trivalent chromium compound formed on said plating layer, a primer composed of a material selected from the group consisting of epoxy resin formed on said chromate film, and a resin layer selected from the group consisting of polyvinyl fluoride and polyvinylidene fluoride resins formed on said chromate film through said primer.

7. The resin coating structure of claim 6, wherein a copper layer is further provided on the surface of the metal tube.

8. The resin coating structure of claim 6, wherein the metal tube is a steel tube or an aluminum tube.

9. The resin coating structure claim 6, wherein the metal tube comprises a single-wound tube, a double-wound tube, an electro-resistance-welded steel tube or a solid-drawn steel tube.

* * * * *

UNITED STATES PATENT AND TRADEMARK OFFICE
CERTIFICATE OF CORRECTION

PATENT NO.     : 6,500,565 B2                                     Page 1 of 1
DATED          : December 31, 2002
INVENTOR(S)    : Masayoshi Usui It is certified that error appears in the above-identified patent and that said Letters Patent is hereby corrected as shown below:

<u>Title page,</u>
Item [30], Foreign Application Priority Data, should read:

-- [30]   Foreign Application Priority Data

August 30, 1994    (JP) ………………….. 6-228921 --

Signed and Sealed this

First Day of April, 2003

JAMES E. ROGAN
*Director of the United States Patent and Trademark Office*